Oct. 12, 1965 K. MAICHEN 3,211,024
CONTINUOUSLY VARIABLE EPICYCLIC FRICTION GEAR
Filed Jan. 26, 1962 3 Sheets-Sheet 1

INVENTOR
KARL MAICHEN

BY *Jurie and Smiley*

ATTORNEYS

Oct. 12, 1965 K. MAICHEN 3,211,024
CONTINUOUSLY VARIABLE EPICYCLIC FRICTION GEAR
Filed Jan. 26, 1962 3 Sheets-Sheet 2
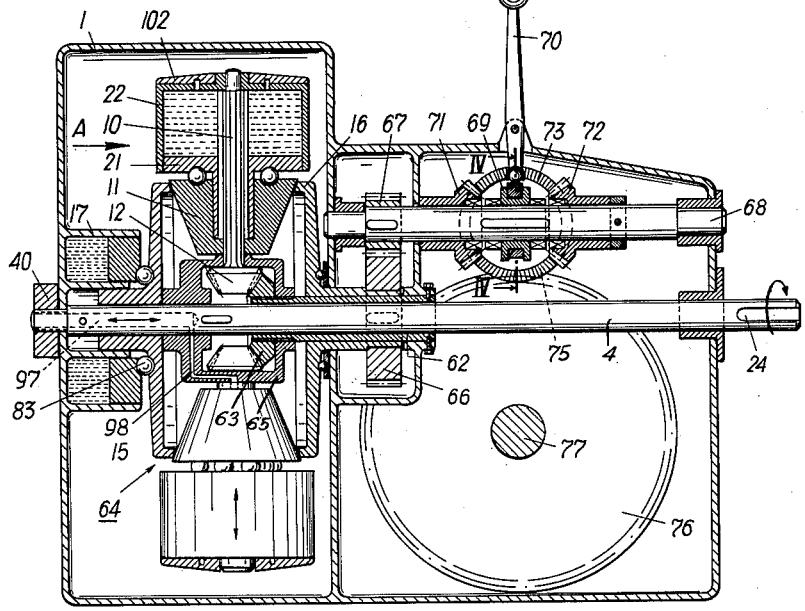
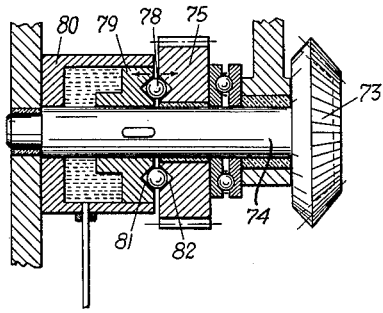
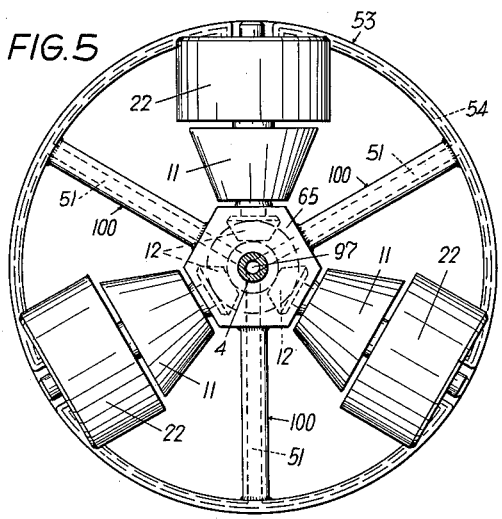
INVENTOR
KARL MAICHEN
BY *Fuirie and Smiley*
ATTORNEYS United States Patent Office 3,211,024
Patented Oct. 12, 1965

3,211,024
CONTINUOUSLY VARIABLE EPICYCLIC
FRICTION GEAR
Karl Maichen, 34 Bahnhofstrasse, Vienna, Austria
Filed Jan. 26, 1962, Ser. No. 168,926
Claims priority, application Austria, Jan. 30, 1961,
A 735/61
19 Claims. (Cl. 74—796)

This invention relates to a continuously variable epicyclic friction gear unit comprising sun wheels and cone-shaped planet wheel members which are uniformly supported by fluid pressure owing to the special design of the gear unit. Besides, the cone-shaped members are provided in a special arrangement to substantially reduce the high friction which is created in known gear units by velocity differences occurring at the line of contact of two cone-shaped members rolling on each other and which results in a wear of the rolling surfaces.

The invention provides a continuously variable epicyclic friction gear unit comprising a housing in which rotary input and output members are mounted, at least one pin connected to one of said rotary members and extending outwardly from the axis of said member, at least one cone-shaped member slidably fitted on said pin, said rotary members tending to throw the cone-shaped member outwardly on its pin by the action of centrifugal force, at least one axially slidable sun wheel which is centrically disposed with respect to the gear axis and cooperates with the cone-shaped members, said cone-shaped members being hydraulically supported from the outside.

It is another feature of the invention to provide pistons which are guided in hydraulic cylinders and engage the cone-shaped members to displace the same, the hydraulic cylinders of all cone-shaped members being interconnected.

It is a further feature of the invention that the hydraulic cylinders of the cone-shaped members are connected to hydraulic cylinders serving to support the sun wheel.

Finally, it is a feature of the invention that the generatrices of all cone-shaped members intersect in the gear unit axis when said cone-shaped members are in a predetermined position.

Figure 1:
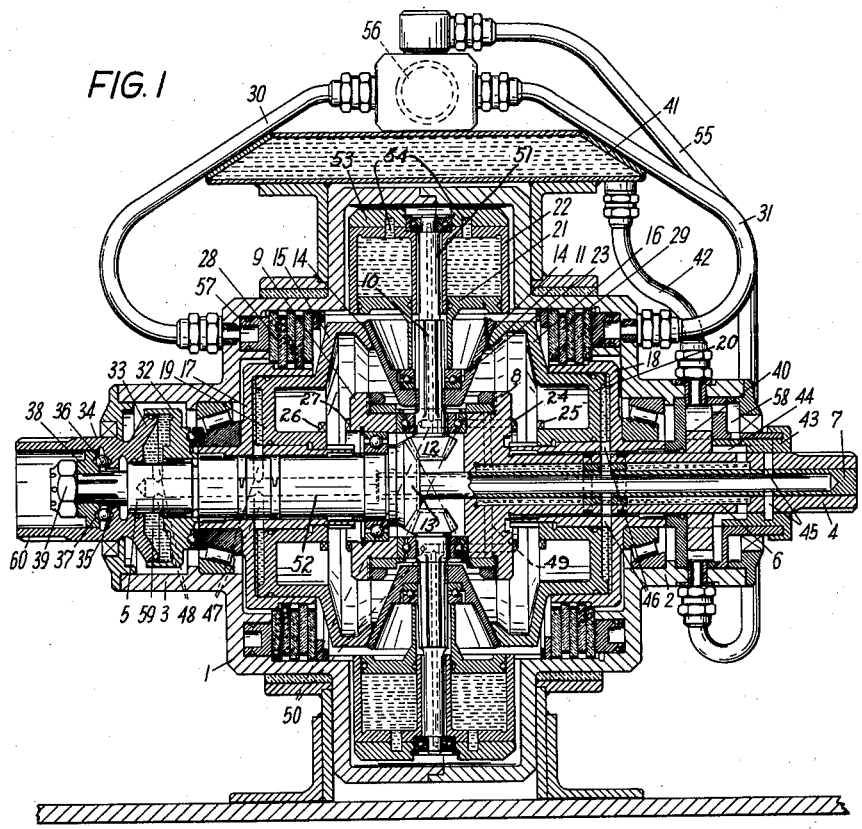
Figure 2:
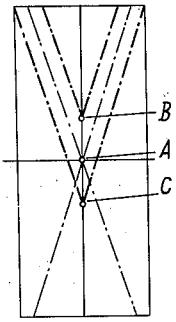
Figure 6:
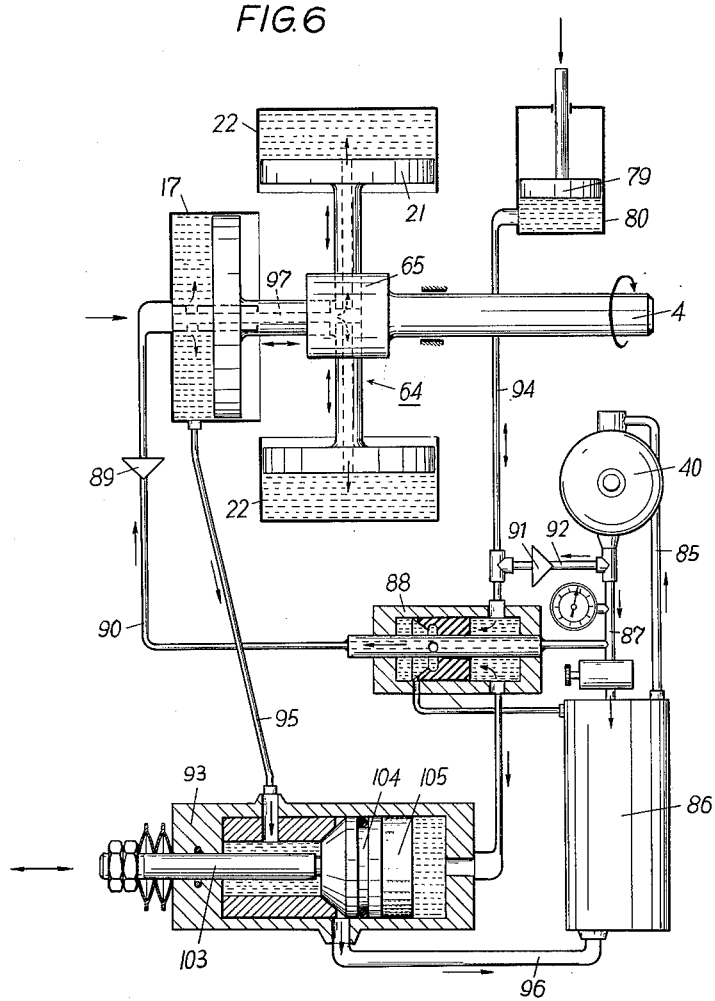

An illustrative embodiment of the epicyclic friction gear unit according to the invention is shown on the drawing. FIG. 1 is an axial longitudinal sectional view showing the gear unit. FIG. 2 is a diagram illustrating the points of intersection, which determine the friction, developed into a plane. FIG. 3 is an axial longitudinal sectional view showing a second embodiment of the gear unit. FIG. 4 is a sectional view taken on line IV—IV of FIG. 3. FIG. 5 shows the input spider viewed in the direction of arrow A in FIG. 3 when the front friction wheel is removed, and FIG. 6 is a diagrammatic view of the conduits for conducting pressure oil for automatically controlling the gear unit.

As is apparent from FIG. 1, the friction gear unit is accommodated in a housing 1 having lateral bosses 2, 3 for mounting the input and output shafts 4 and 5, respectively. The input shaft 4 is provided with an axial cavity 6, which is enlarged in a step and in which a sleeve 7 closed at one end is inserted to define a passage of annular cross-section. The input shaft 4 is provided at its inner end with a flange 8, which has a protruding ring 9, in which pins 10 are mounted which are uniformly angularly spaced and the axes of which are at right angles to the gear axis. Each of the pins 10 carries a vertically adjustable cone-shaped member 11, which is centrically fitted on the pin 10. The pin and the cone-shaped member are coupled for joint rotation by interengaging grooves and ribs. The cone-shaped members 11 have straight generatrices and taper toward the gear axis. At their inner ends, the pins 10 carry bevel wheels 12, which mesh with a common bevel wheel 13 carried by the output shaft 5. The input shaft is preferably provided with free-wheels or clutches, with which the transmission of motion can be interrupted.

Sun wheels 15, 16 are forced against the cone-shaped members 11 at diametrically opposite points 14. These sun wheels are provided with plungerlike extensions 19, 20, which are sealed and movable in hydraulic cylinders 17, 18. The cone-shaped members 11 are engaged by hydraulic pistons 21, which are sealed and movable in cylinders 22. Thrust bearings 23 are provided between the pistons 21 and the cone-shaped members 11 to accommodate the rotation of the cone-shaped members 11 so that this movement will not be transmitted to the pistons 21.

The cone-shaped members 11 have such a shape that when they are all in predetermined position, as indicated in FIG. 1, their generatrices intersect at a point of the gear axis. When the cone-shaped members are in this position, the friction occurring between them at the line of contact owing to the differential velocity equals zero. In the embodiment shown in the drawing, the position of the cone-shaped wheels 11 at which friction is zero is that position in which the greatest speed reduction is effected. It is desirable to provide this position at a speed ratio of 1:2, when the cone-shaped wheels are approximately midway of their displacement. In the graph shown in FIG. 2, the intersection of the generatrices of the cone-shaped wheels in this position is indicated at A. B is the intersection at the smallest speed reduction (change-over to direct drive) and C the intersection at the greatest speed reduction.

The flange 8 and the sun wheel 16 and the ring 9 and the sun wheel 15 are provided with claws 24, 25 and 26, 27, which can be caused to interengage, as will be explained hereinafter. The sun wheels 15, 16 are engaged by multiple-disc brakes 28 and 29, respectively, which are hydraulically operated by means of the oil conduits 30, 31.

The cylinder 17 communicates with a thrust member 32, which forms a cylinder closed at one end and the cavity of which is closed by the bottom 33 of a sleevelike extension 34, which bears on the stepped-down end of the output shaft 5 and is provided with a roof-shaped annular groove on a surface which faces away from the thrust member 32. A plurality of balls 36 are contained in this groove. Each of these balls engages one of a plurality of shallow depressions 37 in a second thrust member 38 so that the parts 32, 33 and 34 can act as a back-pressure element known in the hydraulic art as a "multiplier." The thrust member 38 is slidably mounted at the end of the output shaft 5 and is held in position by a nut 39.

Oil is supplied to the various hydraulic cylinders by an oil pump 40, which sucks the oil through a conduit 42 from a reservoir 41 and in dependence on the position of a slide valve 43 supplies pressurized oil either, as shown, through the pressure conduit 44 to duct 6 or through the second duct in slide valve 43, which second duct is indicated with dotted lines, and ducts 45 in the input shaft 4 to the internal cavity of the sleeve 7. This cavity is continued by a duct 52 which extends in the axis of the output shaft and communicates through the duct 46 with the cylinder 18, through the ducts 47 with the cylinder 17, and through the ducts 48 with the space enclosed between the thrust member 32 and the extension 34.

The duct 6 communicates through the ducts 49 in flange 8 with the ducts 50 in ring 9. The ducts 50 open into ducts 51 formed in spokes 100 (FIG. 5) of a rim member 53, in which the cylinders 22 are inserted with uniform angular spacings. Each of the above-mentioned spokes is disposed between two adjacent ones of said cylinders 22. The ducts 51 communicate with ducts 54, which are formed in the rim member 53 and communicate with the interior of the cylinders 22. As a result, all cylinders 22 are interconnected so that any pressure changes will immediately result in an equalization of pressure between the cylinders and the cone-shaped members 11 will always be under uniform load.

Pressure oil is supplied to conduits 30, 31 through the condiuts 55, which leads to the discharge space of the oil pump 40, and a rotary valve member 56 provided with a relief valve, which prevents an overloading of the entire hydraulic system. In addition, the relief valve enables the setting of any desired pressure applied to the friction wheels.

If the friction gear unit which has been described is intended for a motor vehicle, it will have the following mode of operation. Depending on the adjustment of the slide valve 43, which may be a rotary or axially displaceable valve, the existing condition of torque conversion is either maintained or the speed reduction is increased or reduced or the direct gear is inserted or the drive is shifted to the reverse gear. The slide valve may be shifted by hand, by a pendulum governor or by the accelerator pedal.

When the motor is running, the input shaft 4 coupled thereto drives by means of the flange 8 and the ring 9 the pins 10 and the cone-shaped members 11 fitted thereon. For a forward movement of the vehicle, the cone-shaped members 11 roll on the stationary sun wheel 15 and transmit their rotation to the pins 10. The sun wheel 15 is fixed by the multiple-disc brake 28, which is operated by the pressure oil acting from conduit 30 on piston 57 when the rotary valve 56 is set accordingly. When the rotary valve is in this position, the conduit 31 is connected by a return conduit, not shown, to the reservoir 41. The sun wheel 16 is then unbraked and is freely rotated by the cone-shaped members 11. The pins 10 impart their rotation through the cone-shaped wheels 12, 13 to the output shaft 5.

If this condition is to be maintained, the slide valve 43 will be set so that the pressure conduit from the continuously operating pump is separated from duct 6 as well as from duct 45. The pressure oil flows only through the pressure conduit 55 to the rotary valve 56, the relief valve of which discharges the surplus oil into the reservoir 41.

When it is desired to reduce the speed reduction, the slide valve 43 is adjusted so as to connect the pressure conduit from the pump to the ducts 45 and to connect the ducts 6 to the return conduit 58 leading to the suction side of pump 40. This causes pressure oil to enter the cylinders 17, 18, whereby the sun wheels 15, 16 are forced against each other. The sun wheels 15, 16 will then urge the cone-shaped members 11 outwardly. As is readily apparent from the drawing, the oil which is displaced by the cone-shaped members out of the cylinders 22 by the intermediary of the pistons 21 flows to the suction side of pump 40. As soon as the desired setting of the cone-shaped members 11 is achieved, the slide valve 43 is returned to its original position, in which the ducts 45 and 6 are blocked. The described outward adjustment of the cone-shaped members 11 may be continued until the claws 24, 25 and 26, 27 interengage to establish the direct gear. In this position those parts of the gear unit which are disposed in the housnig 1, inclusive of the cylinders 17, 18, are locked together to form a rigid body, which connects the input shaft 4 to the output shaft 5 without torque conversion. The rotary valve 56 is then set to connect both conduits 30, 31 to the return conduit leading to the reservoir 41, as during idling, so that the two disc brakes 28, 29 are released.

To increase the speed reduction, the slide valve 43 is adjusted to connect the interior space of the sleeve 7 to the suction side and to connect the duct 6 to the discharge side of the pump 40. As a result, pressure oil enters the cylinder 22 and forces the cone-shaped members 11 toward each other by means of the pistons 21. The cone-shaped members 11 urge the sun wheels 15, 16 apart and engage the conical surfaces 14 at a larger radius than before. The oil displaced by the extensions 19, 20 out of the cylinders 17, 18 flows through the sleeve 7 to the suction side of pump 40.

The movement of the gear unit is reversed by shifting the rotary valve so that pressure oil is conducted through pipe 31 rather than pipe 30, whereas the latter is connected to the return conduit leading to the reservoir 41. As a result, the brake 28 is lifted and brake 29 is applied. The cone-shaped members 11 are now rolling on the sun wheel 16 and drive the sun wheel 15.

During the conversion of torque, the balls 36 apply pressure to the extension 34. This pressure is transmitted by the liquid body 59, the thrust member 32 and the sleeve 17 to the sun wheel 15 to increase the contact pressure between the latter and the cone-shaped members 11. This force may be further increased by the back pressure resulting, e.g., from the provision of helical teeth 60 on the extension 34 on which torque is derived from the gear unit.

The gear unit according to the invention consists of prefabricated parts. The sun wheels and many other parts of the gear unit are identical in shape so that their manufacture is particularly simple.

In the illustrative embodiment shown in FIG. 3, the input spide 64 is slidably mounted in the input shaft 4 for rotation therewith and has a housing 65 for accommodating the cone-shaped wheels 12. The latter mesh with a common, stationary sun wheel 63, which is slidably and non-rotatably mounted on a stationary sleeve 62.

As distinguished from the embodiment shown in FIG. 1, the sun wheel 16 has an elongated sleeve to which a gear 66 is fixed, which meshes with a gear 67 of a shaft 68, which is parallel to the shaft 4. The shaft 68 is provided with a clutch 69, which can be selectively engaged with one of the bevel wheels 71, 72 by means of a lever 70. The bevel wheels 71, 72 mesh with a bevel wheel 73, which is mounted on a shaft 74 at right angles to shaft 68, as is shown in FIG. 4. At this point a spur gear 75 is mounted, which meshes with a spur gear 76 on the output shaft 77. The spur gear 75 bears by means of balls 78 on a plunger 79 of a pressure oil cylinder 80. The balls 78 serve as back pressure-producing elements and are received by appropriate shallow depressions 81, 82 of the plunger 79 and the spur gear 75.

The friction wheel 15 bears on the plunger 83 of the pressure oil cylinder 17. As the input spider 64 with the housing 65 is axially slidable, the pressure applied by the plunger 83 is uniformly transmitted to the rolling contact surfaces of the cone-shaped members 11, on the one hand, and the sun wheels 15 and 16, on the other hand.

FIG. 6 shows that the pump 40 is connected on its suction side by the conduit 85 to an oil container 86 and on its discharge side by the conduit 87, a relief valve 88 and the conduit 90 incorporating a check valve 89 to the pressure oil cylinders 22 and 17. By a conduit 92 provided with a check valve 91, the conduit 87 is connected to a conduit 94, which leads from the cylinder 80 through the relief valve 88 to the relief valve 93. From the relief valve 93, a conduit 95 leads to the cylinder 17 and a conduit 96 leads to the container 86.

The described gear unit operates as follows: When the shaft 4 is driven, the pump 40 is operated and the housing 65 is rotated and causes the pins 10 to rotate about the axis of shaft 4. As a result, the cone-shaped wheels 12 roll on the sun wheel 63 and cause the pins 10 to rotate about their own axes. The rotation of the cone-shaped members 11 driven by the pins 10 is transmitted by the friction wheel 16 and the gears 66, 67 to the shaft 68. Depending on the engagement of the clutch 69 with the bevel wheel 71, the movement of the shaft 68 is transmitted in a forward or reverse sense to the shaft 74, which drives the spur gear 75 by means of the plunger 79 and the balls 78. The rotation of the spur gear 75 is transmitted by the spur gear 76 to the output shaft 77.

The pump 40 sucks pressure fluid through conduit 85 from container 86 and discharges the fluid into conduit 87 and through conduit 92 and check valve 91 into conduit 94. If there is only a low pressure in the cylinder 80, the pressure applied to the plungers 21 by the centrifugal force of the cone-shaped members 11 during the rotation of the input spider 64 will displace pressure fluid out of the cylinders 22. This pressure fluid is drained through cylinder 17, conduit 95, valve 93 and conduit 96 into container 86. As a result, the cone-shaped members 11 travel outwardly so that the transmission ratio approaches a direct drive.

In the case of a higher torque, the pressure fluid in the cylinder 80 offers a correspondingly higher resistance to the valve 93. The pressure fluid is retained by the check valve 89 in conduit 90 and urges the cone-shaped members 11 toward each other so that the same approach the position which corresponds to the first gear, depending on the resistance to the movement of the vehicle.

The check valve 89 compels the pressure fluid to flow along the described path. The pressure fluid from the duct 90 is conducted to the cylinders 22 through the bore 97 of shaft 4, which bore communicates with the cylinder 17, the duct 98 in housing 65, the ducts 51 in the spokes 100 between the cylinders 22 and the ducts 54 of the rim member 53 carrying the cylinders 22.

To adjust the pump 40 to the variable loads, capacities and pressures, the relief valve 88 controls the pressure fluid flow in dependence on the load caused by the plunger 79. A manually adjustable relief valve provided with a pressure gage protects the transmitting members from overload. Another adjustment for controlling the gear unit may be provided by a means, not shown, such as a lever of the like, for displacing the piston rod 103 and the valve cone 104. When the gear unit is used in a motor vehicle, this arrangement will enable the vehicle to be accelerated or braked as desired, and will thus considerably contribute to an improvement of the general safety. A resilient cushion 105 in valve 93 ensures that the valve cone 104 will be closed by resilient pressure.

The described gear unit is particularly desirable for motor vehicles having a rear engine. It may be designed to have a zero position because the calculation indicates an idling position.

Various modifications in design are possible within the scope of the invention. For instance, the cone-shaped surfaces 14 may be curved rather than flat, as described. Besides, the multiple-disc brakes may be replaced by cone brakes or hand brakes. Finally, a plastic or gaseous medium may be used instead of pressure oil.

As another alternative, the pins 10 may be mounted in an unmovable housing so that they can only rotate about their own axis. In this case, the shaft 5 may serve as an input shaft, the sun wheel 15 serving only as a supporting disc freely rotatably mounted on the shaft 5, whereas the sun wheel 16 serves as an output disc and is coupled to the output member, consisting of the shaft 4, for rotation therewith. The input shaft 5 carries in addition to the bevel wheel 13 an opposite second bevel wheel and either of these two bevel wheels is engaged with the bevel wheels 12 depending on whether the gear unit is set for forward or reverse motion. This bevel gearing may be enclosed in a rigid housing. To increase the control range, the output member may be provided with a subsequently arranged epicyclic gear unit. The extensions 19, 20 may be separate from the sun wheels 15, 16 serving now as a supporting disc and output disc, respectively, and may engage said discs with thrust bearings interposed. The hydraulic cylinders of the sun wheels and of the cone-shaped wheels are rigidly connected to the gear housing in which the pins 10 are mounted. In this modification, the epicyclic friction gear unit described hereinbefore is a prearranged gear unit. The control shown in FIG. 6 may also be provided in the embodiment shown in FIG. 1. In this case, the thrust member 32 has the function of the plunger 79 and the conduit 94 is connected to the liquid body 59, the conduit 95 then relieving both cylinders 17 and 18.

What is claimed is:

1. A continuously variable epicyclic friction gear unit comprising a housing, rotary input and output members mounted in said housing, at least one pin rotatable about its own axis connected to one of said rotary members and extending outwardly from the axis of said member, a cone-shaped member tapering toward said axis slidably fitted on each said pin and movable outwardly along the pin by centrifugal force during rotation of the pin, a pair of opposed sun wheels, at least one of which is axially displaceably mounted in said housing, a fluid pressure cylinder movably supporting said displaceable sun wheel, said cone-shaped member being in rolling contact with both said sun wheels, a second fluid pressure cylinder including a piston displaceable therein, a bearing means including rolling elements engaged by said piston at one side and engaging said cone-shaped member at the other side to urge the cone-shaped member inwardly toward said axis, said second cylinder with said piston and said cone-shaped member forming an assembly which is rotatable about said axis of said rotary member.

2. A friction gear unit as set forth in claim 1, wherein said second fluid pressure cylinders of all cone-shaped members are provided with interconnecting conduits so that each exerts the same pressure on its associated cone-shaped member.

3. A friction gear unit as set forth in claim 2, wherein fluid conduits connect said second cylinders of the cone-shaped members to said first cylinder supporting the displaceable sun wheel.

4. A friction gear unit as set forth in claim 3, wherein an oil pump having a suction side and a discharge side is connected to said first and second cylinders, and means is provided for selectively and alternatingly connecting either the suction or discharge side of said oil pump to said cylinders.

5. A friction gear unit as set forth in claim 4, wherein said means for selectively and alternatingly connecting either the suction or charge side of the oil pump includes a slide valve.

6. A friction gear unit as set forth in claim 1, wherein the generatrices of all cone-shaped members intersect in said axis of the rotary member when said cone-shaped members are in predetermined positions on said pins.

7. A friction gear unit as set forth in claim 6 wherein the generatrices of all cone-shaped members intersect in said axis of the rotary member when the cone-shaped members are positioned corresponding to the highest load.

8. A friction gear unit as set forth in claim 6, wherein the generatrices of all cone-shaped bodies intersect in said axis of the rotary member when the cone-shaped members are positioned approximately midway of the torque conversion range.

9. A friction gear unit as set forth in claim 1, wherein both said sun wheels are freely displaceable axially of said rotary member, and means is provided for selectively fixing either of said sun wheels against rotation.

10. A friction gear unit as set forth in claim 1, wherein at least one element for producing back pressure is provided to increase the contact pressure between the sun wheels and the cone-shaped member, said back pressure element including a pressure fluid cushion operatively connected to influence the pressure of fluid in said first fluid pressure cylinder.

11. A friction gear unit as set forth in claim 10, wherein said back pressure element produces a back pressure in dependence on the resistance encountered and forms part of the rotary output member, and valve means for controlling the discharge of pressure fluid from said second cylinder is provided which is pressure controlled by said back pressure element.

12. A friction gear unit as set forth in claim 11, wherein a check valve in a conduit is provided for supplying pressure fluid to said second cylinder.

13. A friction gear unit as set forth in claim 12, wherein a relief valve is provided in said conduit for supplying pressure fluid to said second cylinder.

14. A friction gear unit as set forth in claim 13, wherein a second relief valve in a return conduit is provided and another conduit leads from said back pressure element to said second relief valve and extends through said first relief valve incorporated in the pressure fluid supply conduit.

15. A friction gear unit as set forth in claim 14 wherein a pump for circulating the pressure fluid is connected at its discharge side through said second relief valve to said back pressure element.

16. A friction gear unit as set forth in claim 13, wherein said relief valve incorporated in the pressure fluid supply conduit controls the pressure fluid flow in dependence on the pressure in said back pressure element.

17. A friction gear unit as set forth in claim 14, wherein said second relief valve in the return conduit is provided with a displaceable piston rod and a valve cone to control the return flow.

18. A friction gear unit as set forth in claim 17, wherein said second relief valve for controlling the return flow of pressure fluid incorporates a resilient cushion to ensure that the valve cone will be closed by resilient pressure.

19. A friction gear unit as set forth in claim 1, wherein a connecting member is provided which carries said pins on which the cone-shaped members are fitted, said connecting member being provided with first clutch elements, second clutch elements interengageable with said first clutch elements being formed on said sun wheels, whereby in a predetermined position of axial displacement of the sun wheels said first and second clutch elements engage to cause a direct transmission of force from the rotary input member to the rotary output member.

References Cited by the Examiner
UNITED STATES PATENTS

| | | | |
|---|---|---|---|
| 888,265 | 5/08 | Ruland | 74—208 X |
| 2,029,042 | 1/36 | Turner | 74—691 X |
| 2,079,681 | 5/37 | Chilton | 74—796 |
| 3,006,206 | 10/61 | Kelley et al. | 74—208 X |
| 3,023,644 | 3/62 | Maichen | 74—796 |

DON A. WAITE, *Primary Examiner.*

BROUGHTON G. DURHAM, *Examiner.*